United States Patent [19]

Wolf

[11] Patent Number: 5,137,150
[45] Date of Patent: Aug. 11, 1992

[54] CONTAINER FOR RECORDING MEDIA SUCH AS MAGNETIC TAPE CASSETTES

[76] Inventor: Hans J. Wolf, Theodor Schweitler Strasse, D-7137 Sternenfels, Fed. Rep. of Germany

[21] Appl. No.: 591,265

[22] Filed: Oct. 1, 1990

[30] Foreign Application Priority Data

Sep. 29, 1989 [DE] Fed. Rep. of Germany ....... 3932584

[51] Int. Cl.$^5$ .......................................... B65D 85/575
[52] U.S. Cl. .................................. 206/307; 206/387; 220/339
[58] Field of Search ....................... 206/307, 309, 387; 220/335, 339

[56] References Cited

U.S. PATENT DOCUMENTS

| | | | |
|---|---|---|---|
| 3,909,088 | 9/1975 | Dennehey et al. | 206/387 |
| 4,253,568 | 3/1981 | Long et al. | 206/387 |
| 4,314,637 | 2/1982 | Posso | 206/387 |
| 4,365,711 | 12/1982 | Long et al. | 206/387 |
| 4,401,220 | 8/1983 | Kim | 206/387 |
| 4,627,534 | 12/1986 | Komiyama et al. | 206/387 |

FOREIGN PATENT DOCUMENTS

| | | | |
|---|---|---|---|
| 0854022 | 10/1970 | Canada | 206/387 |
| 2555734 | 6/1977 | Fed. Rep. of Germany | 206/387 |
| 1408516 | 10/1975 | United Kingdom | |

Primary Examiner—Jimmy G. Foster
Attorney, Agent, or Firm—Spensley, Horn, Jubas & Lubitz

[57] ABSTRACT

A container for a recording medium, such as a magnetic tape cassette, consists of a receptacle, which receives the recording medium in a partially pocket-like manner, and of a cover pivotably connected with it. The faces and side walls of the container are distributed between the receptacle and the cover in such a way that the receptacle constitutes a face of the container as well as at least a portion of the side walls adjoining this face, while the opposite face of the container is formed by the cover, so that a removal opening for the lateral insertion or lateral removal of the recording medium is formed. If the face formed by the cover directly adjoins a portion of the side wall of the container, also formed by the cover, a manipulation surface is created by means of which the container can be opened, similar to a pocket lighter, by a simple movement of the thumb, while the hand of the user firmly grips the receptacle. By means of this a simple, one-handed manipulation for removal is achieved, while the recording medium is prevented from falling out of the container in an uncontrolled manner.

19 Claims, 3 Drawing Sheets

CONTAINER FOR RECORDING MEDIA SUCH AS MAGNETIC TAPE CASSETTES

BACKGROUND OF THE INVENTION

1. Field of the Invention

The invention relates to a container for recording media, such as magnetic tape cassettes, CDs, floppy disks, etc., consisting of a receptacle which contains and encloses the recording medium in a partially pocket-like manner and of a cover pivotably connected to the receptacle and forming one of the faces of the container as well as at least a portion of a side wall of the container adjoining the one face in such a way that in the course of opening of the container the cover opens by pivoting around the pivot axis and releases the recording medium for removal.

2. Prior Art

Containers of the above-described type are commercially available and millions of them are presently in use, for example for audio magnetic tape cassettes. The receptacle, containing the magnetic tape cassette in its lower part in a partially pocket-like manner, is shaped in such a way that it extends over the length of the container, and two faces which are partially integrally formed are used to support pivot or hinge pins of the cover. In this case the cover forms all of the two faces and one of the side walls of the container.

Therefore the pivot axis of this known container is located parallel to the side walls and the direction of insertion or removal of the cassette from the receptacle extends perpendicular to the pivot axis.

The spatial distribution or assignment of the faces and side walls of this known container to the receptacle or the cover and the geometry which is set because of the disposition of the pivot axis result in a procedure for removing an inserted cassette which as a rule requires that the receptacle and the cover each must be grasped by a respective hand, after which the pivotal movement is performed. Although a single-handed manipulation of this known container is not basically impossible, it is not ergonometrically satisfactory and as a rule leads to an uncontrolled flipping movement with the result that in most cases the magnetic tape cassette falls out of the receptacle.

BRIEF SUMMARY OF THE INVENTION

It is an object of the invention to improve the known container in such a way that a simple, one-handed manipulation for removal is made possible, permitting controlled removal.

A further object of the invention is to provide a structurally simple container having the above capabilities.

The above and other objects are achieved, in accordance with the invention by a container for a recording medium, the container having two opposed side walls and two opposed end faces extending between the side walls, and the container comprising a receptacle forming a pocket which partially encloses the recording medium, and a cover pivotably connected to the receptacle and forming a first one of the end faces of the container as well as at least a first portion of one side wall of the container, which portion adjoins the first one of the end faces, the cover being pivotal relative to the receptacle in an opening direction for releasing a recording medium held in the container for removal from the container in a given direction relative to the container, wherein: the end faces and side walls of the container are distributed between the receptacle and the cover such that the receptacle forms a second one of the end faces of the container which is opposite to the first one of the end faces, as well as at least a second portion of the one side wall and at least a portion of the other side wall adjoining the second one of the end faces; the receptacle is formed to provide a removal opening at the location of the first one of the end faces for permitting insertion and removal of the recording medium in the given direction when the cover is pivoted in the opening direction; and the pivot axis between the receptacle and the cover extends at least approximately parallel to the given direction.

The concept of the invention essentially involves a defined assignment of the end faces and side walls of the container to the receptacle and the cover. In this connection, one of the end faces of the container is formed by the receptacle and there constitutes, together with at least a portion of the side walls adjoining this end face, the receiving pocket for the magnetic tape cassette. The other end face of the container, located opposite the bottom of the receiving pocket formed by the first end face, is formed exclusively by the cover. The receptacle provides an opening here which permits the removal or insertion of a magnetic tape cassette when the cover, with the end face, which closes this opening, is pivoted away.

In contrast to the known container, the removal direction of the recording medium therefore extends parallel to the side walls of the container.

In accordance with an advantageous embodiment, the end face of the container formed by the cover is arranged to directly adjoin a portion of the side wall of the container also formed by the cover. This portion of the side wall acts as the manipulation surface for a finger, preferably the thumb, of the user, whose hand firmly grasps the receptacle. It is possible for the user to act over a very short "manipulation distance" on this manipulation surface with a movement of the thumb and to perform, or at least initiate, the pivoting open of the cover and thus the clearing of the removal opening of the receptacle.

According to a further feature of the invention, the pivot axis is inclined by an angle, in particular an acute angle, $\alpha$ in relation to the side wall of the container located opposite the manipulation surface.

This embodiment has the advantage, on the one hand, that the pivotal movement of the cover is limited to 180°, because the top of the cover rests on the top of the receptacle in the open state. On the other hand, this placement of the pivot axis results in a spatial movement of the manipulation surface which to a large extent corresponds to the arcuate movement of the thumb of a user when opening the container, so that the thumb of the user can come to rest over a large angular section of the manipulation surface and thus control the opening operation.

Because of these steps, the manipulation of the container in accordance with the invention can be approximately compared with the manipulation of, for example, a pocket cigarette lighter, which is being firmly grasped in the hand of the user and where the comparable function (lighting of the flame) is performed by a thumb movement of the user.

If, in accordance with a possible improvement of the container in accordance with the invention, the receptacle and cover are connected with each other by elastic or flexible means, opening of the container according to the invention can be triggered in the most simple case by thumb pressure on the manipulating surface so that a catch or lock means disposed there are released.

In this way the container in accordance with the invention permits the controlled and assured removal of a magnetic tape cassette from the container with a minimum of operational effort and minimal structural and material outlay.

Audio magnetic tape cassettes are particularly addressed in this connection and the exemplary embodiment described below relates to these. However, it is obvious that such a container can also be adapted to other types of cassettes, for example video cassettes or other recording media such as CDs, floppy disks or the like by simply geometric modification of the container. In these cases it may be possible to omit the restrictions based on the disposition of support pins, if desired.

An exemplary embodiment of the container in accordance with the invention will be described in detail with reference to the drawings.

DESCRIPTION OF THE PREFERRED EMBODIMENTS

Figure 1:
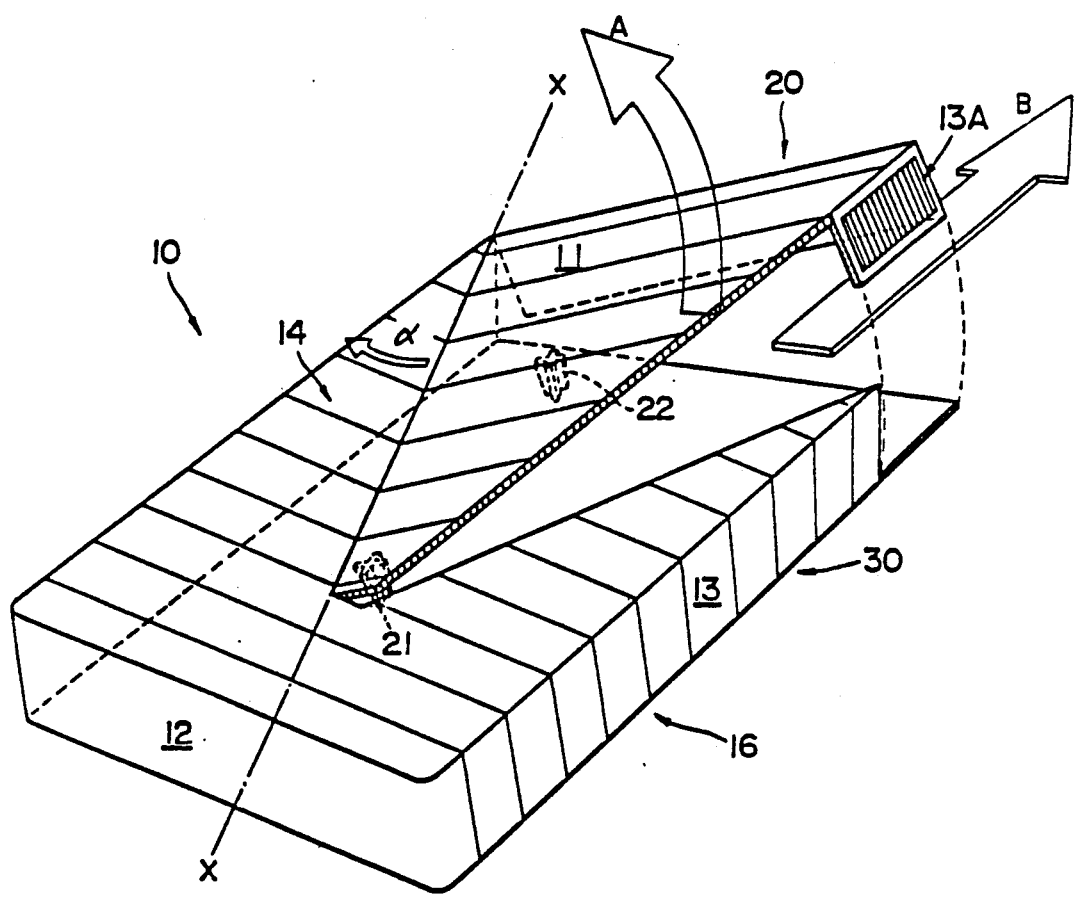
FIG. 1 is a perspective view of a container according to a preferred embodiment of the invention with a partially opened cover and without a magnetic tape cassette.
Figure 2:
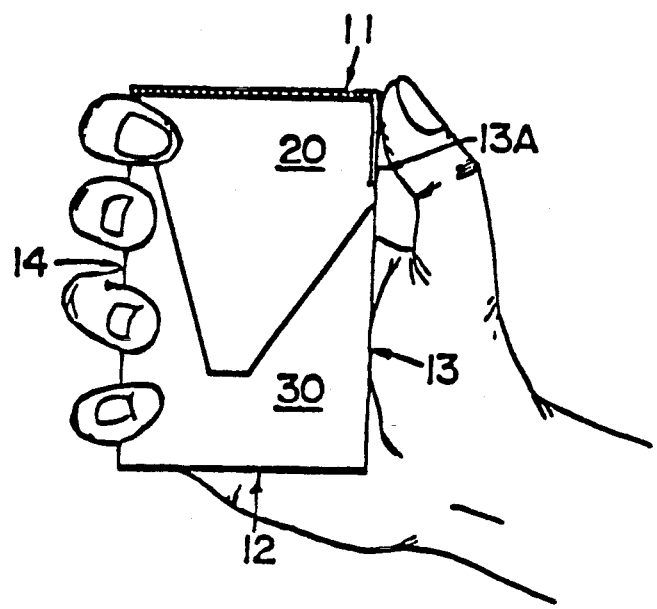
FIG. 2 is a pictorial view showing the manipulation of the container of FIG. 1 in the closed state.
Figure 3:
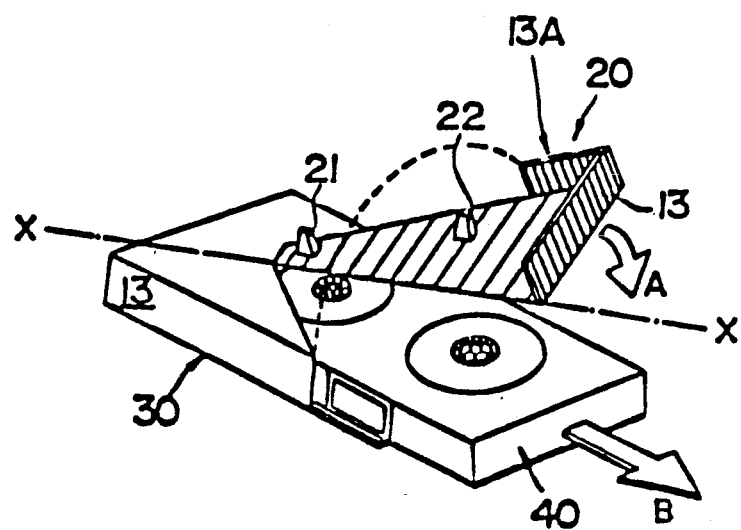
FIG. 3 is a perspective view of the container of FIG. 1 with the cover opened and a magnetic tape cassette partially withdrawn.

Referring first to the embodiment shown in FIGS. 1-3, the container 10 consists of a receptacle 30, in which a magnetic tape cassette 40 (FIG. 3) is contained in a pocket-like manner, and a cover 20.

Receptacle 30 forms the bottom 16 of the container, an end face 12, a complete side wall 14 and a partial side wall 13 extending over the major portion of the length of container 10. The top of container 10 is formed partially by receptacle 30 and partially by cover 20. Cover 20 carries two support pins 21, 22 on its inner surface and these pins, in the closed position of container 10, engage the associated insertion holes of magnetic tape cassette 40 and fix the cassette in place in container 10.

In addition, cover 20 forms an end face 11 opposite the end face 12 which is formed by receptacle 30, and a portion 13A of the adjacent side wall which serves as a manipulation surface.

The receptacle 30 and the cover 20 are connected with each other along a pivot axis X—X in such a way that in the course of an upward pivotal movement of cover 20 (arrow A), and provided the pivot angle is sufficiently large (at least 90°), cassette 40 is released from pins 21 and 22 so that it can be laterally removed (removal direction B) from the container or, if the container is suitably inclined, can slide out of it.

In this connection, the pivot axis X—X can be essentially disposed parallel to the removal direction B. However, in the exemplary embodiment shown it is inclined at an acute angle α with respect to side wall 14, so that in the course of flipping open the cover 20, the manipulation surface 13A describes an arc of a circle inclined towards the face 12 which to a large extent corresponds to the opening movement of the thumb when gripping the container as indicated in FIG. 2.

The hinge which creates pivot axis X—X can be structurally designed in different ways, for example by a foil partially overlapping the receptacle 30 and the cover 20, which forms an appropriate hinge. It is also possible to create the pivot axis X—X by means of a film hinge, i.e by an appropriate thinning of the transition area between cover 20 and receptacle 30 along the pivot axis X—X.

As illustrated in FIGS. 1-3, flipping open can be achieved simply by manual activation. However, it is also possible to dispose or integrate, for example in the area of the pivot axis X—X or by a suitable design of the material in the area of the pivot axis X—X, spring elements which pull the cover 20 upwards when a catch or snap closure (not shown) is triggered by action on the manipulation surface 13A.

The distribution of the side walls and faces between cover 20 and receptacle 30 illustrated in FIGS. 1-3 is not mandatory. However, formation of a receptacle which is closed to a large extent as a result of assignment of the two side walls 13 and 14 to receptacle 30 has the advantage of an assured guidance of the magnetic tape cassette 40 in the removal direction B and, together with a large portion of the top of the container, results in great mechanical stability of receptacle 30, along with easy and assured gripping by the hand of the operator. Division of the top of container 10 into cover 20 and receptacle 30 only needs to be accomplished in such a way that the two support pins 21, 22 are located on the underside of cover 20 and release magnetic tape cassette 40 when there is a sufficient opening angle of the cover 20. Because of this, there are new possibilities in regard to this distribution for the design of such a container, for example by means of arcuate edges or lines of separation between the receptacle and the cover.

The structural design of the illustrated container also has the advantage that, after insertion of a magnetic tape cassette, the closing of the cover 20 on top of the receptacle 30 is also possible with the movement of one hand, namely by a short, abrupt movement of the cover 20 opposite the direction of the arrow A. Because of this, the cover is swung opposite to the opening direction A and again closes the container after the magnetic tape cassette has been inserted.

The container has been shown in its state of use in the illustrations in accordance with FIGS. 1 to 3, without regard to the particular type of manufacture of such a container.

Figure 4:
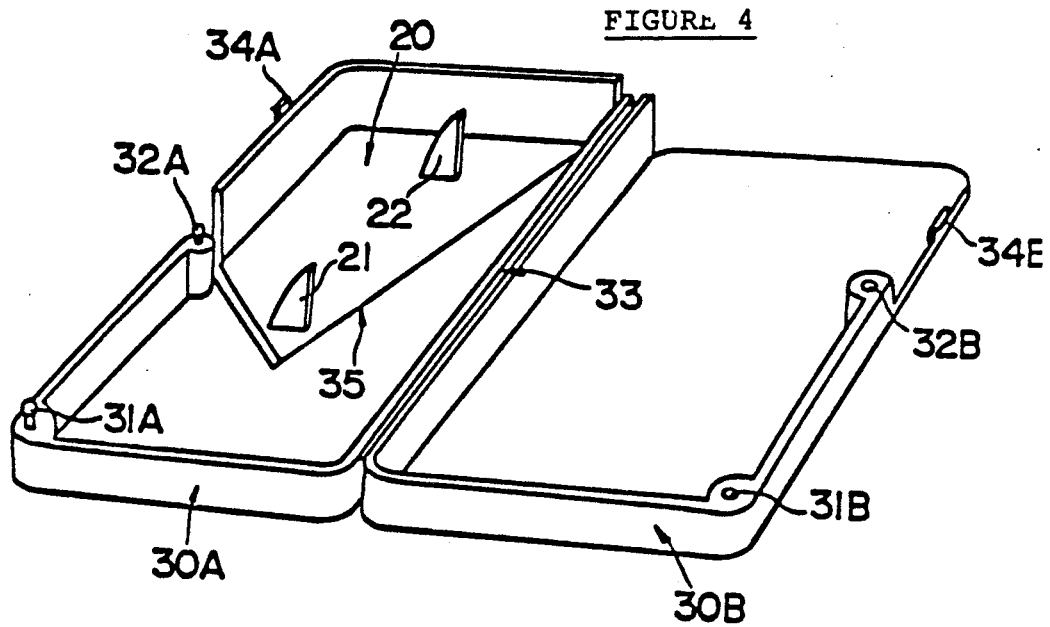
FIGS. 4 and 5 are perspective views of an exemplary embodiment of a variation of the container of FIGS. 1 to 3.
Figure 5:
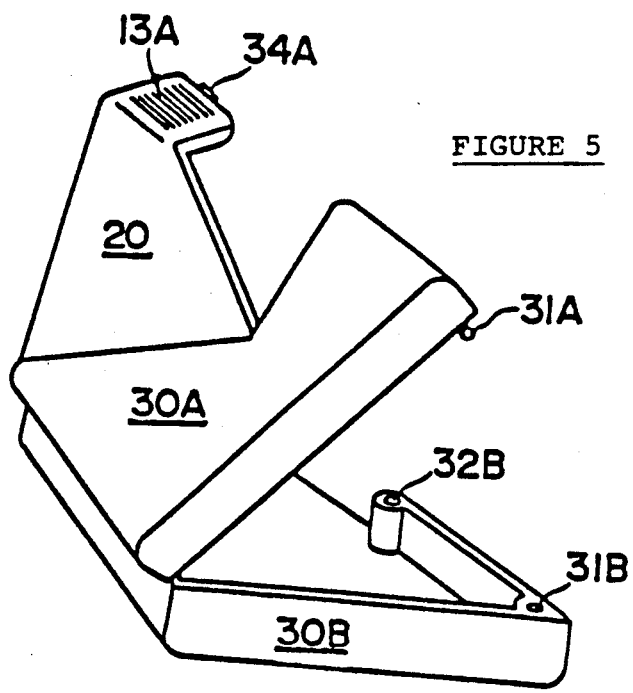

FIGS. 4 and 5 now show a particularly simple and practical form of construction for the container in accordance with FIGS. 1 to 3, by means of which simple manufacture, e.g. by molding, in one piece becomes possible.

In FIGS. 4 and 5, receptacle 30 has been divided into two halves 30A and 30B, which are connected along their adjacent side walls via an integrally molded film hinge 33. Cover 20 is completely hinged to the upper half 30A of receptacle 30, also by means of an integrally molded film hinge 35.

Such a structure can be produced in one piece and in one operation with suitable tools, so that for forming the completed container it is merely required to pivot upper half 30A on top of lower half 30B.

To attain a solid connection of the two halves 30A, 30B, they are provided with catches, for example hooks or heads 31A, 32A in one half which snap or catch in corresponding catch holes 31b, 32B of the other half, so that the container is securely maintained in its position of use in the snapped together state.

Additional catch devices 34A, 34B are used for holding cover 20 in engagement with the opposite edge of receptacle 30B such that cover 20 can be released by thumb pressure on the manipulation surface 13A and is flipped open.

This application relates to subject matter disclosed in Federal Republic of Germany Application No. P 39 32 584, filed on Sept. 29, 1989, the disclosure of which is incorporated herein by reference.

While the description above refers to particular embodiments of the present invention, it will be understood that may modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A container for a recording medium, said container having two opposed side walls and two opposed end faces extending between said side walls, and said container comprising a receptacle forming a pocket which partially encloses the recording medium, and a cover pivotably connected to said receptacle and forming a first one of said end faces of said container as well as at least a first portion of one said side wall of said container, which portion adjoins said first one of said end faces, said cover being pivotal relative to said receptacle in an opening direction for releasing a recording medium held in said container for removal from said container in a given direction relative to said container, wherein: said end faces and said side walls of said container are distributed between said receptacle and said cover such that said receptacle forms a second one of said end faces of said container which is opposite to said first one of said end faces, as well as at least a second portion of said one side wall and at least a portion of the other said side wall adjoining said second one of said faces; said receptacle is formed to provide a removal opening at the location of said first one of said end faces for permitting insertion and removal of the recording medium in the given direction when said cover is pivoted in the opening direction; the pivot axis between said receptacle and said cover extends at least approximately parallel to the given direction; said first one of said end faces of said container directly abuts said first portion of said one side wall of said container, and said first portion of said one side wall forms a manipulation surface which is manually engageable for pivoting said cover in the opening direction; and said manipulation surface has a plurality of the ribs or grooves formed to establish a firm engagement with the thumb of a user.

2. A container in accordance with claim 1 wherein said container further has opposed top and bottom walls extending between said end faces and said side walls, and said cover forms only a fraction of said top wall of said container.

3. A container in accordance with claim 2 wherein said cover is a one-piece unit.

4. A container in accordance with claim 1 further comprising a film hinge connecting said cover to said receptacle and defining the pivot axis.

5. A container in accordance with claim 1 further comprising a foil piece connecting said cover to said receptacle and defining the pivot axis.

6. A container for a recording medium, said container having two opposed side walls and two opposed end faces extending between said side walls, and said container comprising a receptacle forming a pocket which partially encloses the recording medium, and a cover pivotably connected to said receptacle and forming a first one of said end faces of said container as well as at least a first portion of one said side wall of said container, which portion adjoins said first one of said end faces, said cover being pivotal relative to said receptacle in an opening direction for releasing a recording medium held in said container for removal from said container in a given direction relative to said container, wherein: said end faces and said side walls of said container are distributed between said receptacle and said cover such that said receptacle forms a second one of said end faces of said container which is opposite to said first one of said end faces, as well as at least a second portion of said one side wall and at least a portion of the other said side wall adjoining said second one of said faces; said receptacle is formed to provide a removal opening at the location of said first one of said end faces for permitting insertion and removal of the recording medium in the given direction when said cover is pivoted in the opening direction; the pivot axis between said receptacle and said cover extends at least approximately parallel to the given direction; said first one of said end faces of said container directly abuts said first portion of said one side wall of said container; said first portion of said one side wall forms a manipulation surface which is manually engageable for pivoting said cover in the opening direction; and said container has a bottom wall formed by said receptacle and extending between said end faces and said side walls, and further comprising a catch or snap connector connecting said manipulation surface with said bottom wall of said receptacle.

7. A container in accordance with claim 6 wherein said container further has a top wall opposed to said bottom wall and extending between said end faces and said side walls, and said cover forms only a fraction of said top wall of said container.

8. A container in accordance with claim 7 wherein said cover is a one-piece unit.

9. A container in accordance with claim 6 further comprising a film hinge connecting said cover to said receptacle and defining the pivot axis.

10. A container in accordance with claim 6 further comprising a foil piece connecting said cover to said receptacle and defining the pivot axis.

11. A container for a recording medium, said container having two opposed side walls and two opposed end faces extending between said side walls, and said container comprising a receptacle forming a pocket which partially encloses the recording medium, and a cover pivotably connected to said receptacle and forming a first one of said end faces of said container as well as at least a first portion of one said side wall of said container, which portion adjoins said first one of said end faces, said cover being pivotal relative to said receptacle in an opening direction for releasing a recording medium held in said container for removal from said container in a given direction relative to said container, wherein: said end faces and said side walls of said container are distributed between said receptacle and said cover such that said receptacle forms a second one of said end faces of said container which is opposite to said first one of said end faces, as well as at least a second portion of said one side wall and at least a portion of the other said side wall adjoining said second one of said faces; said receptacle is formed to provide a removal opening at the location of said first one of said end faces for permitting insertion and removal of the recording medium in the given direction when said cover is pivoted in the opening direction; the pivot axis between said receptacle and said cover extends at least approximately parallel to the given direction; said first one of said end faces of said container directly abuts said first portion of said one side wall of said container; and said first portion of said one side wall forms a manipulation surface which is manually engageable for pivoting said cover in the opening direction, said container further comprising elastic or flexible means connected between said receptacle and said cover for causing said cover to snap open in said opening direction when said manipulation surface is manually actuated.

12. A container for a recording medium, said container having two opposed side walls and two opposed end faces extending between said side walls, and said container comprising a receptacle forming a pocket which partially encloses the recording medium, and a cover pivotably connected to said receptacle and forming a first one of said end faces of said container as well as at least a first portion of one said side wall of said container, which portion adjoins said first one of said end faces, said cover being pivotal relative to said receptacle in an opening direction for releasing a recording medium held in said container for removal from said container in a given direction relative to said container, wherein: said end faces and said side walls of said container are distributed between said receptacle and said cover such that said receptacle forms a second one of said end faces of said container which is opposite to said first one of said end faces, as well as at least a second portion of said one side wall and at least a portion of the other said side wall adjoining said second one of said faces; said receptacle is formed to provide a removal opening at the location of said first one of said end faces for permitting insertion and removal of the recording medium in the given direction when said cover is pivoted in the opening direction; and the pivot axis between said receptacle and said cover is inclined at an acute angle to the given direction.

13. A container for a recording medium, said container having two opposed side walls and two opposed end faces extending between said side walls, and said container comprising a receptacle forming a pocket which partially encloses the recording medium, and a cover pivotably connected to said receptacle and forming a first one of said end faces of said container as well as at least a first portion of one said side wall of said container, which portion adjoins said first one of said end faces, said cover being pivotal relative to said receptacle in an opening direction for releasing a recording medium held in said container for removal from said container in a given direction relative to said container, wherein: said end faces and said side walls of said container are distributed between said receptacle and said cover such that said receptacle forms a second one of said end faces of said container which is opposite to said first one of said end faces, as well as at least a second portion of said one side wall and at least a portion of the other said side wall adjoining said second one of said faces; said receptacle is formed to provide a removal opening at the location of said first one of said end faces for permitting insertion and removal of the recording medium in the given direction when said cover is pivoted in the opening direction; the pivot axis between said receptacle and said cover extends at least approximately parallel to the given direction; and each of said end faces and each of said side walls is formed exclusively either by said cover or said receptacle so that no overlapping exists between said receptacle and said cover.

14. A container in accordance with claim 13 wherein said container further has opposed top and bottom walls and extending between said end faces and said side walls, and said cover forms only a fraction of said top wall of said container.

15. A container in accordance with claim 14 wherein said cover is a one-piece unit.

16. A container in accordance with claim 13 further comprising a film hinge connecting said cover to said receptacle and defining the pivot axis.

17. A container in accordance with claim 13 further comprising a foil piece connecting said cover to said receptacle and defining the pivot axis.

18. A container in accordance with claim 13 wherein said first one of said end faces of said container directly abuts said first portion of said one side wall of said container, and said first portion of said one side wall forms a manipulation surface which is manually engageable for pivoting said cover in the opening direction.

19. A container for a recording medium, said container having two opposed side walls and two opposed end faces extending between said side walls, and said container comprising a receptacle forming a pocket which partially encloses the recording medium, and a cover pivotably connected to said receptacle and forming a first one of said end faces of said container as well as at least a first portion of one said side wall of said container, which portion adjoins said first one of said end faces, said cover being pivotal relative to said receptacle in an opening direction for releasing a recording medium held in said container for removal from said container in a given direction relative to said container, wherein: said end faces and said side walls of said container are distributed between said receptacle and said cover such that said receptacle forms a second one of said end faces of said container which is opposite to said first one of said end faces, as well as at least a second portion of said one side wall and at least a portion of the other said side wall adjoining said second one of said faces; said receptacle is formed to provide a removal opening at the location of said first one of said end faces for permitting insertion and removal of the recording medium in the given direction when said cover is pivoted in the opening direction; the pivot axis between said receptacle and said cover extends at least approximately parallel to the given direction; and said receptacle comprises two half members, a first film hinge pivotally connecting said two half members together, a second film hinge pivotally connecting said cover to one of said half members, and catch elements secured to said half members for connecting said half members together, whereby said container can be manufactured as a one-piece structure.

* * * * *